(12) United States Patent
Dalla Palma et al.

(10) Patent No.: US 11,773,970 B2
(45) Date of Patent: Oct. 3, 2023

(54) HYDROMECHANICAL TRANSMISSION AND CONTROL METHOD

(71) Applicant: DANA ITALIA S.R.L., Trentino (IT)

(72) Inventors: Lorenzo Dalla Palma, Arco (IT); Claudio Angeloni, Arco (IT)

(73) Assignee: DANA ITALIA S.R.L., Arco (IT)

(*) Notice: Subject to any disclaimer, the term of this patent is extended or adjusted under 35 U.S.C. 154(b) by 82 days.

(21) Appl. No.: 17/448,982

(22) Filed: Sep. 27, 2021

(65) Prior Publication Data

US 2023/0098005 A1   Mar. 30, 2023

(51) Int. Cl.

| | | |
|---|---|---|
| *F16H 61/20* | (2006.01) | |
| *F16H 61/4008* | (2010.01) | |
| *F16H 61/00* | (2006.01) | |
| *F16H 61/47* | (2010.01) | |
| *F16H 61/02* | (2006.01) | |
| *F16H 61/472* | (2010.01) | |

(52) U.S. Cl.
CPC ..... *F16H 61/4008* (2013.01); *F16H 61/0059* (2013.01); *F16H 61/0204* (2013.01); *F16H 61/47* (2013.01); *F16H 61/472* (2013.01); *F16H 2061/205* (2013.01)

(58) Field of Classification Search
CPC ............. F16H 61/4008; F16H 61/0059; F16H 61/0204; F16H 61/47; F16H 61/472; F16H 2061/205; F16H 2312/04; F16H 39/00; F16H 47/04; F16H 59/36
See application file for complete search history.

(56) References Cited

U.S. PATENT DOCUMENTS

| | | |
|---|---|---|
| 7,344,473 B2 | 3/2008 | Ishibashi et al. |
| 7,354,368 B2 | 4/2008 | Pollman |
| 7,815,545 B2 | 10/2010 | Nakashima et al. |
| 8,858,392 B2 | 10/2014 | Dix et al. |
| 8,986,162 B2 | 3/2015 | Dix et al. |
| 2013/0152564 A1 | 6/2013 | Neumann et al. |
| 2015/0367851 A1* | 12/2015 | Yoshizawa ............. E02F 9/202 701/48 |

FOREIGN PATENT DOCUMENTS

| | | | | |
|---|---|---|---|---|
| CN | 109185444 A | * | 1/2019 | ............. F16H 59/48 |
| EP | 2748491 B1 | | 2/2018 | |
| JP | 2567081 B2 | * | 12/1996 | ............. F16H 61/40 |
| WO | WO-2009130553 A1 | * | 10/2009 | ......... F16H 61/0059 |
| WO | WO-2015062773 A1 | * | 5/2015 | ............... B60K 6/12 |

* cited by examiner

*Primary Examiner* — Tisha D Lewis
(74) *Attorney, Agent, or Firm* — McCoy Russell LLP (57) ABSTRACT

Methods and systems for a hydromechanical transmission in a vehicle are provided herein. In one example, the transmission system includes a hydrostatic assembly with a hydraulic pump in fluidic communication with a hydraulic motor. The transmission system further includes a controller configured to selectively transition between a torque control mode and a speed control mode of the hydrostatic assembly while the vehicle is on a slope.

18 Claims, 5 Drawing Sheets

HYDROMECHANICAL TRANSMISSION AND CONTROL METHOD

TECHNICAL FIELD

The present disclosure relates to a hydromechanical transmission and a method for operating the transmission on a slope.

BACKGROUND AND SUMMARY

Hydromechanical transmissions enable performance characteristics (e.g., efficiency, shift quality, drive characteristics, control response, and the like) from mechanical and hydrostatic transmissions to be blended to meet certain design objectives. Hydromechanical variable transmissions (HVTs), provide continuous gear ratio variability and may be particularly desirable due to their efficiency and adaptability. Vehicles used in industries such as agriculture, construction, mining, material handling, oil and gas, and the like have therefore made use of HVTs.

U.S. Pat. No. 8,858,392 B2 to Dix et al. teaches an automatic hill-hold strategy for a continuously variable transmission. Dix's hill-hold method involves the engagement a parking brake to hold the vehicle stationary and the subsequent readying of a swash plate in a hydrostatic assembly of the transmission for subsequent vehicle movement. When vehicle movement is commanded, the parking brake is proportionally released as the transmission is engaged.

The inventors have recognized several drawbacks with Dix's hill-hold strategy. For instance, the reliance on the parking brake to sustain and release hill-hold may lead to unwanted vehicle movement on higher angle slopes, for instance. Further, degradation of the parking brake result in poor hill-hold performance or in some cases, negate the use of the hill-hold strategy. Further, Dix's transmission and other HVTs may exhibit inefficiencies that stem from the pressurization of the hydrostatic assembly during hill-hold operation. Other transmissions may, under certain circumstances, be unsuccessful in the prevention of vehicle slide when the vehicle is restarted from standstill on a hill.

To overcome at least a portion of the abovementioned drawbacks, the inventors developed a hydromechanical transmission system for a vehicle. The transmission system includes a hydrostatic assembly with a hydraulic pump and motor in fluidic communication with one another. The transmission system further includes a controller designed to selectively transition between a torque control mode and a speed control mode of the hydrostatic assembly while the vehicle is on a slope. The speed and torque control modes are strategically implemented to efficiently hold the vehicle in standstill while on the slope while decreasing the chance of the vehicle experiencing unwanted movement (e.g., sliding backwards) when transitioning into or out of hill-hold. For instance, selectively transitioning between the torque and speed control modes may include operating the hydrostatic assembly in the torque control mode in a selected drive range and, when an input device is operated to place the vehicle in a standstill condition, activating the speed control mode in the hydrostatic assembly to achieve a vehicle standstill target. After standstill, a forward drive clutch and a reverse drive clutch may be operated to achieve simultaneous engagement which blocks the transmission output. Once the clutches are engaged and the transmission is blocked, the hydrostatic unit may be again operated in the torque control mode and the pressure in the hydrostatic assembly may be decreased. In this way, clutch blocking may be used to hold the transmission output stationary while the pressure in the hydrostatic unit is reduced to increase transmission efficiency.

Further in one example, the controller may store a differential pressure of the hydrostatic assembly while the vehicle is on the slope, in the standstill state, and prior to reducing the differential pressure of the hydrostatic assembly. In such an example, the control may further repressurize the hydrostatic assembly based on the stored differential pressure value and open a clutch in a mechanical assembly of the hydromechanical transmission system when the vehicle transitions from the standstill state to a drive state. In this way the recorded differential pressure of the hydrostatic assembly is used to reduce the chance the vehicle traveling in an unwanted direction (e.g., back-sliding) when the vehicle exits hill-hold. Using the pre-load pressure in this manner further permits the precise movement of the vehicle on comparatively high angle slopes and permits the standstill condition to be maintained independent from engine speed variation, if desired. Further, using the pre-load pressure enables the vehicle to be restarted from standstill with a lower engine speed, thereby reducing fuel consumption and increasing vehicle efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A hydromechanical transmission and method for operation of the transmission is described herein. The hydromechanical transmission efficiently executes hill-hold through the strategic implementation of torque and speed control modes of a hydrostatic unit during different periods of hill-hold operation. For instance, during an initial phase of hill-hold engagement, the hydrostatic unit in the transmission may be speed controlled while one of the forward and reverse drive clutches begins to close and the other remains closed. In this way, the transmission may be held stationary using speed control while the clutches transition into a blocking configuration. After the clutches are closed to block the transmission's output, torque control of the hydrostatic unit may be resumed and the hydrostatic unit may be depressurized to increase transmission operating efficiency. Further, in some examples, a pre-load pressure that keeps the vehicle at standstill in the speed control mode may be registered. While transitioning out of hill-hold, the pre-load pressure may be used to repressurize the pump and motor in the hydrostatic unit. In this way, the chance of the vehicle traveling in an unintended direction (e.g., sliding backwards) during hill-hold release is decreased. Further, the load learning allows the vehicle to be precisely moved on slopes (e.g., comparatively high angle slopes) and may be implemented independent of engine speed variation and without the use of a mechanical parking brake, in certain scenarios. Still further, the load learning allows the vehicle to be restarted from standstill with a lower engine speed, which decreases fuel consumption and increases vehicle efficiency.

Figure 1:
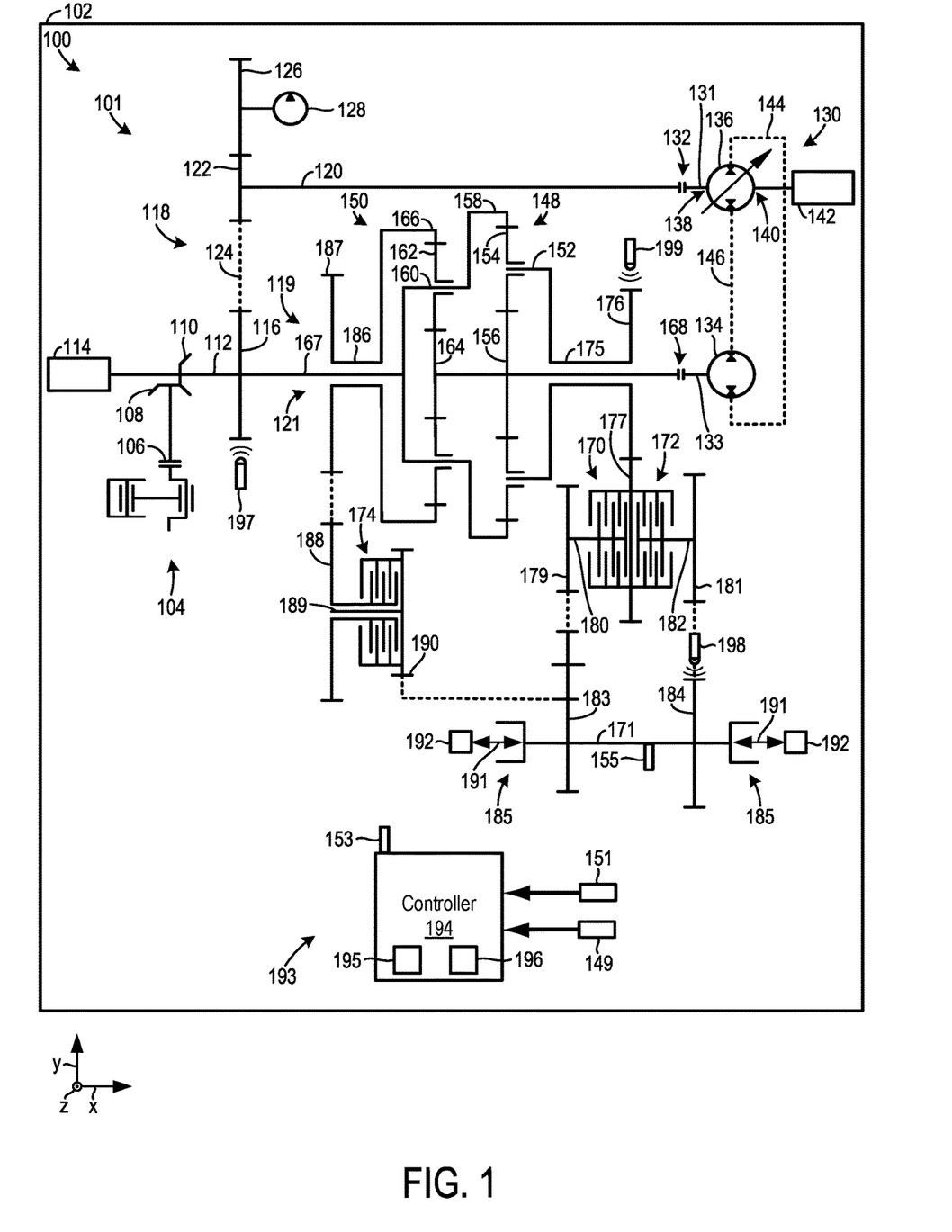
FIG. 1 is a schematic representation of a vehicle with a hydromechanical transmission.
Figure 2:
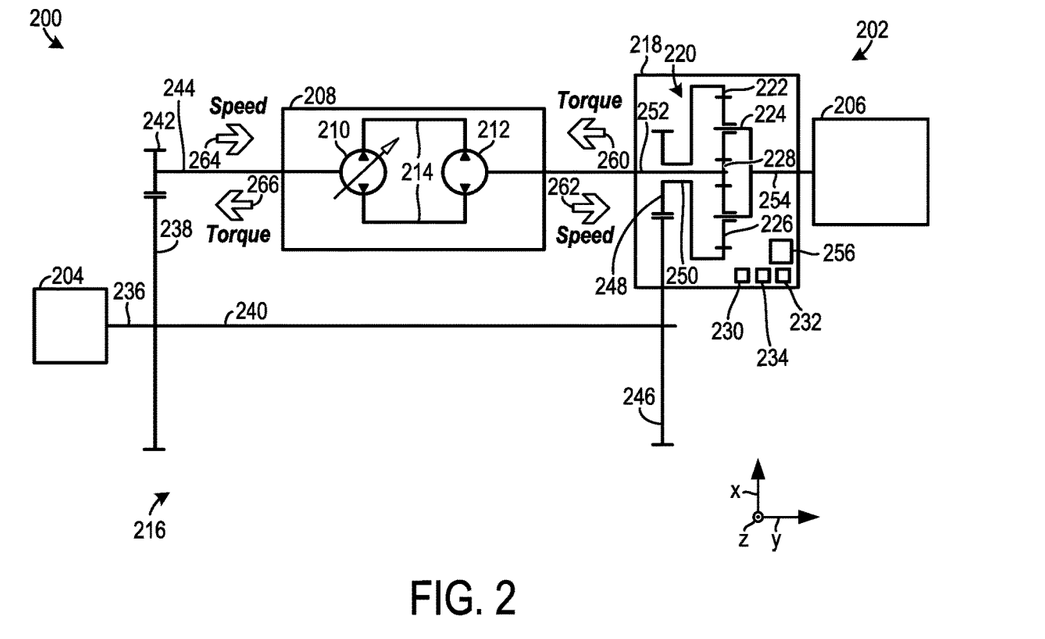
FIGS. 2 and 3 depict a first example of a hydromechanical transmission system operating in torque control mode and a speed control mode, respectively.
Figure 3:
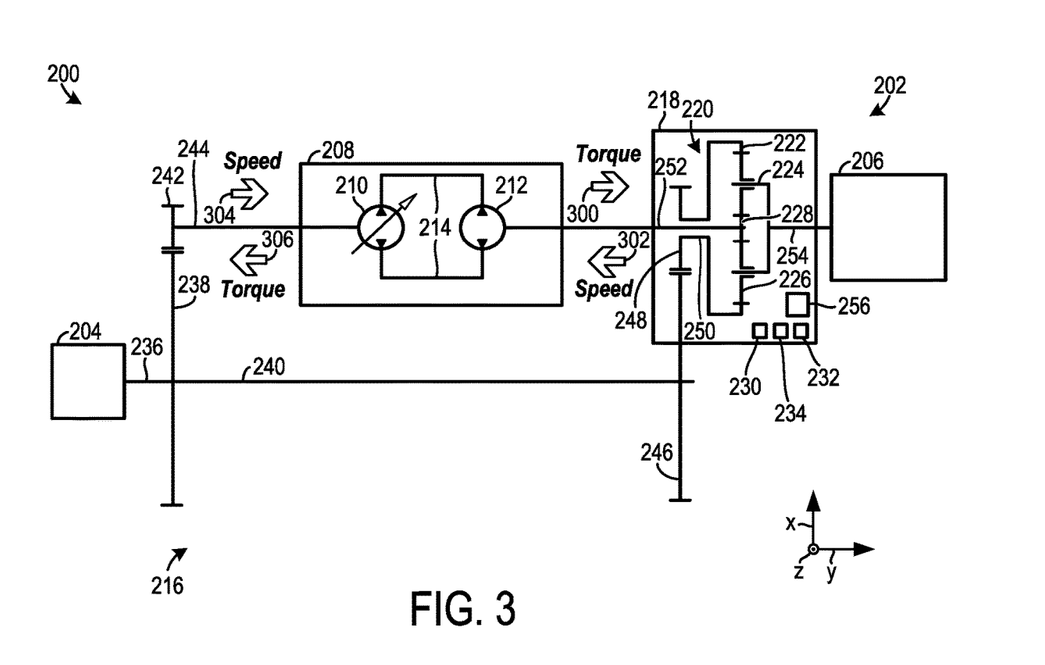
Figure 4:
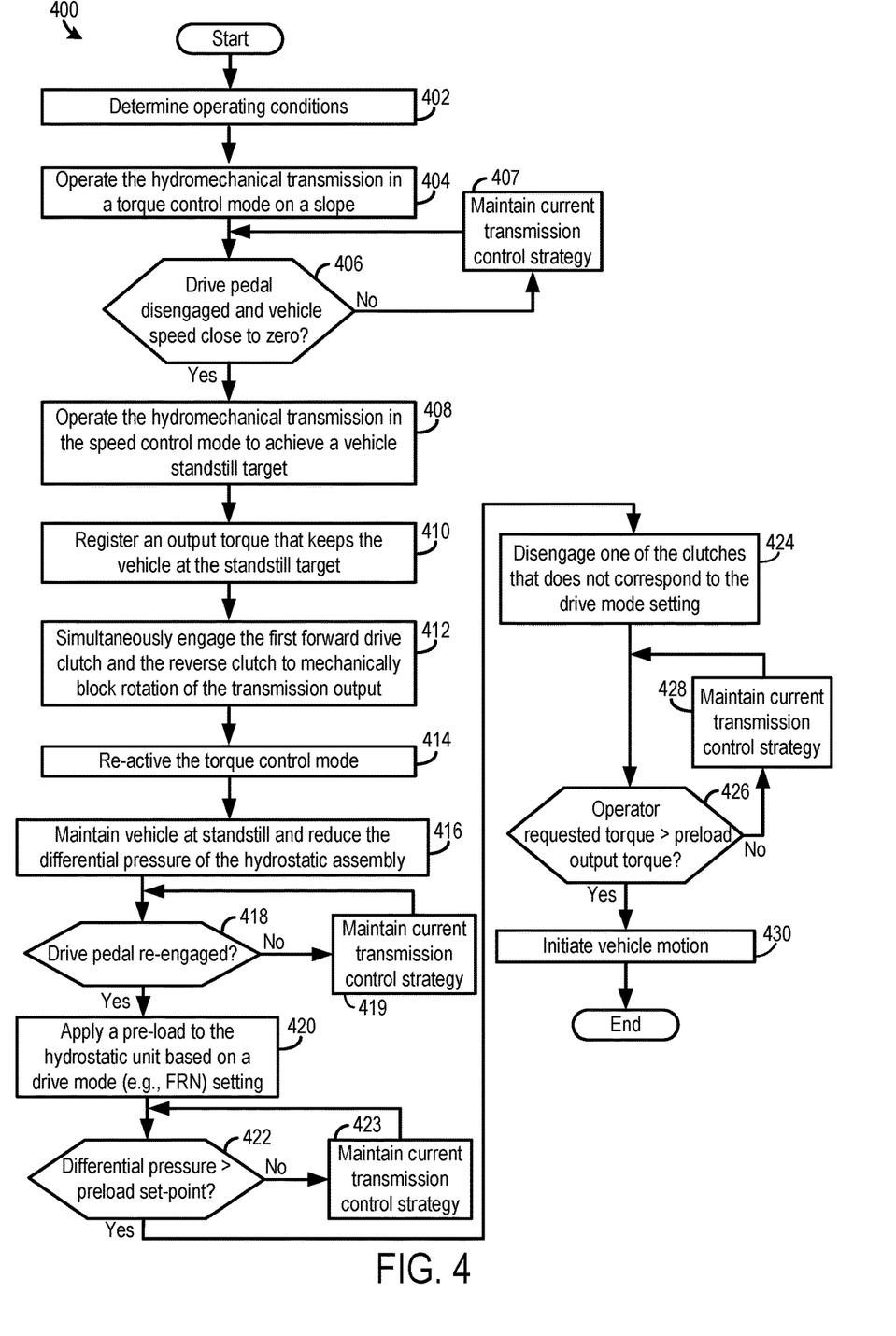
FIG. 4 is a hill-hold method for a hydromechanical transmission.
Figure 5:
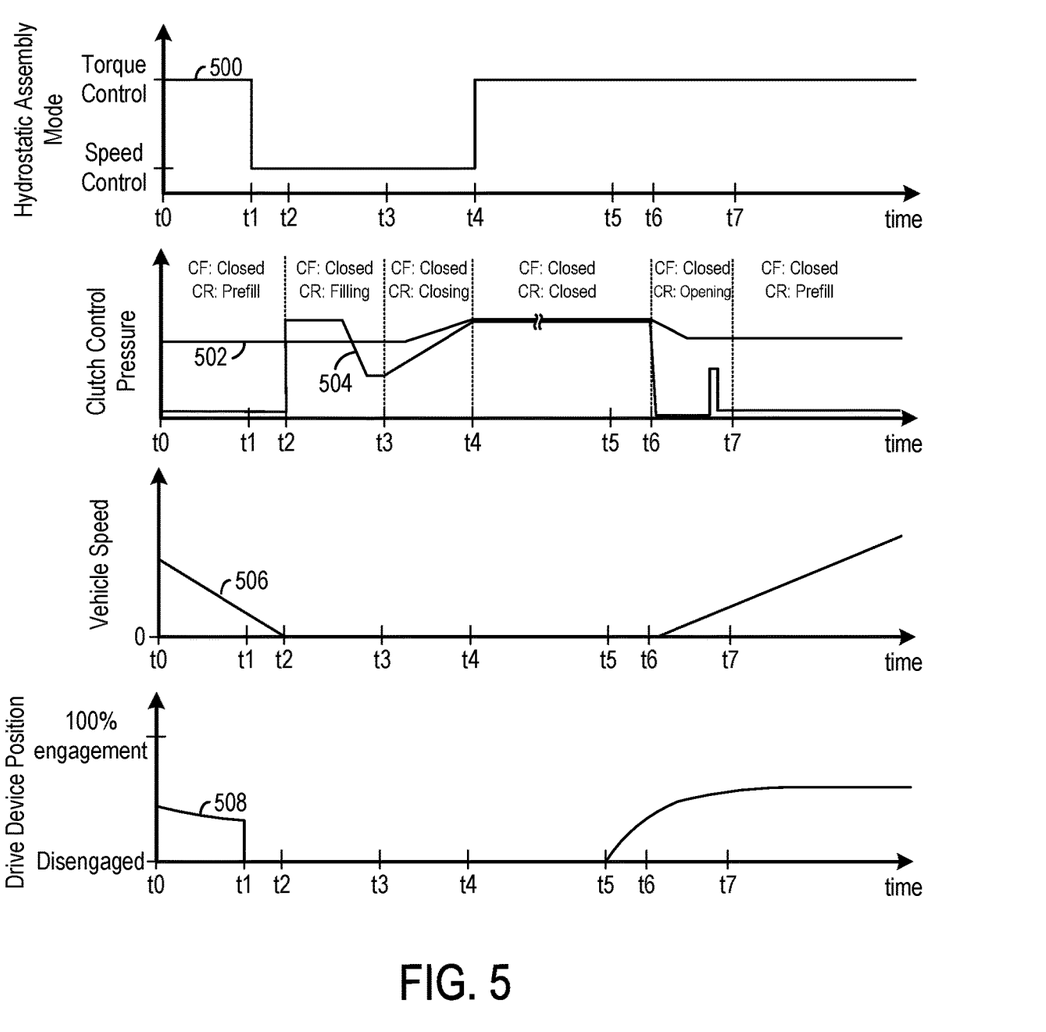
FIGS. 5-6 graphically illustrate different use-case hill-hold control strategies for a hydromechanical transmission.
Figure 6:
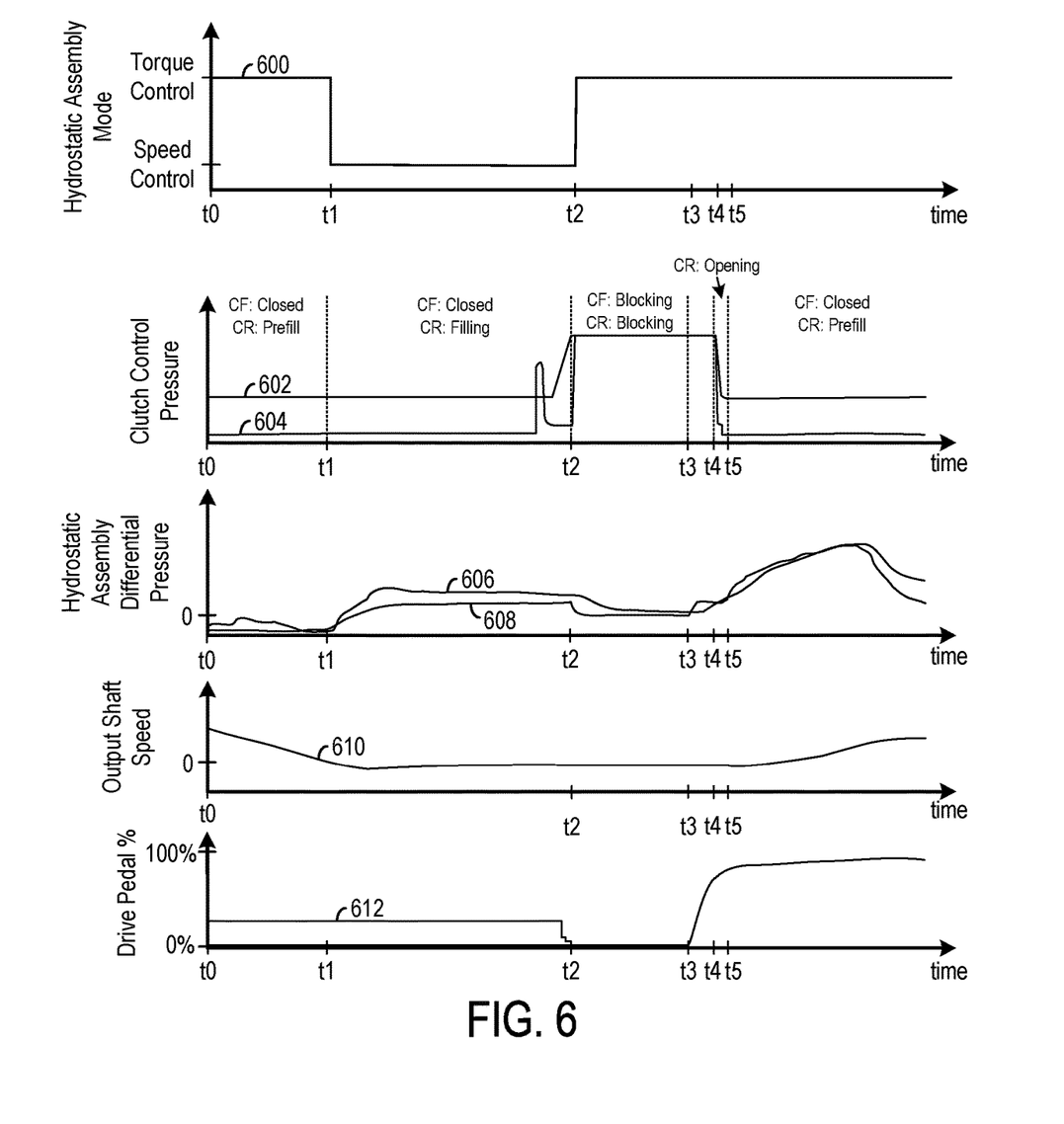

FIG. 1 illustrates a schematic depiction of a hydromechanical transmission with a power-split arrangement that is designed to efficiently operate in a hill-hold mode. FIGS. 2-3 illustrate an exemplary power split transmission operating in a torque control mode and a speed control mode to permit clutch blocking to be carried out during hill-hold. FIG. 4 shows a hill-hold method that strategically implements speed and torque control modes to facilitate depressurization of the hydrostatic assembly and reduce the chance of vehicle slip while exiting the hill-hold mode. FIGS. 5-6 show graphical representations of use-case transmission hill-hold strategies that use clutch blocking and speed-torque control switching to confidently and efficiently maintain the vehicle in a stationary state on a hill and restart vehicle motion without the vehicle traveling in an unintended direction.

FIG. 1 shows a schematic depiction of a transmission system 100 with a hydromechanical transmission 101 (e.g., a hydromechanical variable transmission) in a vehicle 102 or other suitable machine platform. In one example, the vehicle may be an off-highway vehicle, although the transmission may be deployed in on-highway vehicles, in other examples. An off-highway vehicle may be a vehicle whose size and/or maximum speed precludes the vehicle from being operated on highways for extended durations. For instance, the vehicle's width may be greater than a highway lane and/or the vehicle top speed may be below the highways maximum allowable speed, for example. Industries and their corresponding operating environments in which the vehicle may be deployed include forestry, mining, agriculture, etc. In either case, the vehicle may be designed with auxiliary systems driven by hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios.

The transmission system 100 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, increase system complexity through the use of an additional clutch.

The transmission system 100 may include or receive power from a motive power source 104. The power source 104 may include an internal combustion engine, electric motor (e.g., electric motor-generator), combinations thereof, and the like. In one use-case example, the power source 104 may generate greater than 80 kilowatts (kW) of power (e.g., 100-115 kW). However, numerous suitable transmission operating speed ranges have been envisioned.

A torsional damper coupling 106 may be further provided in the transmission. Gears 108, 110, such as bevel gears, may be used to rotationally couple the power source 104 to an input shaft 112. As described herein, a gear may be a mechanical component which rotates and includes teeth that are profiled to mesh with teeth in one or more corresponding gears to form a mechanical connection that allows rotational energy transfer therethrough.

A mechanical PTO 114 may be coupled to the input shaft 112. The mechanical PTO 114 may drive an auxiliary system such as a pump (e.g., a hydraulic pump, a pneumatic pump, and the like), a winch, a boom, a bed raising assembly, etc. To accomplish the power transfer to auxiliary components, the PTO may include an interface, shaft(s), housing, and the like. However, in other examples, the PTO may be omitted from the transmission system. A gear 116 may be coupled to the input shaft 112. A mechanical assembly 118 is further included in the transmission system 100. The mechanical assembly 118 may include the shaft 112 and/or the gear 116 as well as shaft 167, described in greater detail herein. Further, the transmission may include a shaft 120 and a gear 122 rotationally coupled to the gear 116 on the input shaft 112. Dashed line 124 and the other dashed lines depicted in FIG. 1 indicate a mechanical connection between components which facilitates rotational energy transfer therebetween.

A gear 126 meshing with gear 122 may be rotationally attached to a charging pump 128 (e.g., hydraulic pump). The charging pump 128 may be designed to deliver pressurized fluid to hydraulic components in the transmission such as a hydraulic motor 134 (e.g., hydrostatic motor), a hydraulic pump 136 (e.g., hydrostatic pump), and the like. The fluid pressurized by the charging pump may additionally be used for clutch actuator and/or transmission lubrication. The charging pump may include a piston, a rotor, a housing, chamber(s), and the like to allow the pump to move fluid. The mechanical assembly 118 is rotationally coupled in parallel to a hydrostatic assembly 130. Further, the hydrostatic assembly 130 may have a U-shape design where the shafts 131, 133 serving as a mechanical interface for a hydraulic pump 136 (e.g., variable displacement pump) and a hydraulic motor 134 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 130 may be arranged on an opposite side of the transmission as the charging pump 128 and/or axially offset from clutches 170, 172. Arranging the hydrostatic assembly in this manner permits the width of the transmission to be reduced and allows the installation of the transmission in the vehicle to be simplified.

The coupling of the hydrostatic assembly to the mechanical assembly enables the transmission to achieve power split functionality in which power may synchronously flow through either path to additively combine or recirculate power through the system. This power split arrangement allows the transmission's power flow to be highly adaptable to increase efficiency over a wide range of operating conditions. Thus, the transmission may be a full power split transmission, in one example.

The mechanical assembly 118 may include multiple mechanical paths that are coupled in parallel to the hydrostatic assembly. To elaborate, the shaft 167 may serve as a junction for a first mechanical path (e.g., branch) 119 and a second mechanical path (e.g., branch) 121. To elaborate, the first mechanical path 119 may provide rotational energy transfer capabilities from an interface of the hydrostatic assembly 130 to a ring gear 158 of a first planetary gearset 148, during certain operating conditions. Additionally, the second mechanical path 121 may provide rotational energy transfer capabilities from the interface of the hydrostatic assembly 130 to a carrier 160 of a second planetary gearset 150.

The hydrostatic assembly 130 includes the hydraulic motor 134 and the hydraulic pump 136. Further, the hydraulic pump 136 may include a first mechanical interface 138 and a second mechanical interface 140. The first mechanical interface 138 may be rotationally coupled to a mechanical bushing 132 and the second mechanical interface 140 may be rotationally coupled to another mechanical PTO 142. Again, the mechanical PTO may be used to drive an auxiliary vehicle system such as an air compressor, a mechanical arm or boom, an auger, etc. In this way, the transmission may be adapted for a variety of end-use operating environments. Specifically, providing multiple PTOs, in the arrangement depicted in FIG. 1, enables the transmission system to meet end-use design goals in a variety of different types of vehicles, if wanted. As such, the system's applicability is expanded and the customer appeal of the transmission is increased. However, in other examples, the PTOs 114 and/or 142 may be omitted from the transmission.

The hydraulic pump 136 may be a variable displacement bi-directional pump, in one example. Further, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 134 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 144, 146 are attached to hydraulic interfaces in each of the motor and pump to enable the hydrostatic assembly to provide additive and power circulation functionality with regard to the mechanical branches arranged in parallel with the hydrostatic assembly 130. For example, in an additive power mode, power from both the hydrostatic and mechanical assemblies is combined at one of the planetary gearsets and delivered to the transmission output. In a power split mode, power is recirculated through the hydrostatic assembly. Therefore, the hydraulic pump 136 and the hydraulic motor 134 may be operated to flow power to the sun gears of either planetary assembly from the hydraulic motor. Conversely, the pump and the motor may be operated to flow power back to the mechanical branches.

The transmission system 100 further includes the first planetary gearset 148 and the second planetary gearset 150. The first planetary gearset 148 may include a carrier 152 on which planet gears 154 rotate. The planet gears 154 may mesh with a sun gear 156 and the ring gear 158. Likewise, the second planetary gearset 150 may include the carrier 160, planet gears 162, a sun gear 164, and a ring gear 166. Therefore, the second planetary gearset 150 may again be a simple planetary gear set. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motions.

The carrier 160 of the second planetary gearset 150 may be rotationally coupled to the ring gear 158 of the first planetary gearset 148. Further, the carrier 160 of the second planetary gearset 150 may be rotationally coupled to a shaft 167. The shaft 167 may extend through a central opening in an extension 186, described in greater detail herein. This rotational attachment scheme may be conceptually described as a formation of mechanical branches attached in parallel to the hydrostatic assembly 130.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased.

The sun gears 156, 164 of the first and second planetary gearsets 148, 150 may be rotationally coupled (e.g., directly attached) to one another. Attaching the sun gears in this manner may enable the transmission to achieve a desired gear ratio, compactness, and efficiency. The hydraulic motor 134 may be rotationally coupled to the sun gear 156 via a mechanical bushing 168, for instance.

The transmission system 100 further includes a reverse clutch 170, a first forward drive clutch 172, and a second forward drive clutch 174. More generally, the first forward drive clutch may be referred to as a first clutch or a first forward clutch, the reverse drive clutch may be referred to as a second clutch or a reverse clutch and the second forward drive clutch may be referred to as a third clutch or a second forward clutch. Further, the first forward drive clutch 172 and the reverse clutch 170 may be coaxially arranged.

The clutches 170, 172, 174 may be friction clutches that each include two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. Further, the clutches may be hydraulically, electromagnetically, and/or pneumatically actuated. For instance, the clutches may be adjusted via a hydraulic piston. The adjustability may be continuous, in one example, where the clutch may transition through partially engaged states to a fully engaged state, where a relatively small amount of power loss occurs in the clutch. However, in other examples, the clutches may be discretely adjusted.

Further, the clutches 170, 172, 174 may be positioned near to an output shaft 171 and downstream of the planetary assembly. Arranging the clutches in this location allows a targeted compromise between clutch size and clutch speed. For instance, relatively high clutch speeds may generate higher power losses. Further, the reverse clutch 170 and the first forward drive clutch 172 may be arranged adjacent and coaxial to one another. In one particular example, the clutches may have a similar design to reduce manufacturing complexity. This twin clutch arrangement therefore permits manufacturing costs to be reduced and increases the transmission's compactness.

The carrier 152 may include an extension 175 with a gear 176 that meshes with a gear 177. The gear 177, in the illustrated example, is rotationally attached to the reverse clutch 170 and the first forward clutch 172. The reverse clutch 170 and the first forward clutch 172 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 179 may reside on an output shaft 180 of the reverse clutch 170. Likewise, a gear 181 may reside on an output shaft 182 of the first forward clutch 172. Both gears 179, 181 may be rotationally attached to the system output shaft 171 via gears 183, 184 respectively. In this way, both the reverse clutch and the first forward clutch deliver power to the transmission's output, during different operating conditions.

The system output shaft 171 may include one or more interfaces 185 (e.g., yokes, gears, chains, combinations thereof, etc.). The output shaft is specifically illustrated with two outputs. However, the transmission may include an alternate numbers of outputs. The gear 179 is rotationally coupled to the output shaft via meshing with gear 183. Arrows 191 depict the flow of power from the transmission system to drive axles 192 and/or other suitable downstream vehicle components or vice versa. A driveline with a shaft, joints, etc. may be used to carry out the power transfer between the transmission and the axles. It will be understood that the drive axles may include drive wheels. The transmission may further include a parking brake mechanism 161 designed to hold the transmission output stationary. The parking brake may include calipers or other suitable friction devices, an actuator, and the like to maintain the transmission's output in a stationary state.

The ring gear 166 of the second planetary gearset 150 may include the extension 186 with a gear 187 position thereon. The gear 187 may be rotationally attached to a gear 188 in the second forward clutch 174, as indicated via a dashed line. The gear 188 may be coupled to a first set of plates in the clutch 174. A second set of plates in the clutch may be attached to an output shaft 189 and a gear 190. The gear 190 may be rotationally coupled to the gear 183, as indicated by a dashed line. Due to the arrangement of the clutches and the planetary gearsets, the transmission system 100 achieves a higher efficiency and enhanced drivability, comfort, and productivity than previous hydromechanical transmissions.

The transmission system 100 may additionally include a lubrication and hydraulic control system which may include a sump, as previously discussed. These systems may further include conventional components for lubricating and/or adjusting the gears and/or the clutches such as pumps, conduits, valves, and the like.

A control system 193 with a controller 194 may further be incorporated in the transmission system 100. The controller 194 includes a processor 195 and memory 196. The memory 196 may hold instructions stored therein that when executed by the processor cause the controller 194 to perform the various methods, control strategies, calibration techniques, etc., described herein. The processor 195 may include a microprocessor unit and/or other types of circuits. The memory 196 may include known data storage mediums such as random access memory, read only memory, keep alive memory, combinations thereof, etc.

The controller 194 may receive vehicle data and various signals from sensors positioned in different locations in the transmission system 100 and/or the vehicle 102. The sensors may include gear speed sensors 197, 198, 199 which detect the speed of gear 116, gear 184, and gear 176, respectively. In this way, gear speed at the input and the output of the system may be detected along with the gear speed at the output of the first planetary gearset 148. However, in other examples, the speeds of at least a portion of the gears may be modeled by the controller. The vehicle may further include a slope sensor 153 and/or a torque sensor 155. The slope sensor 153 is configured to detect the slope of the vehicle with respect to a gravitational direction (e.g., a horizontal axis) and may therefore include inclinometer. Alternatively, the torque and/or speed of the output shaft and/or the slope of the vehicle may be modeled.

The controller 194 may send control signals to an actuator in the hydraulic pump 136 or an actuation system coupled to the pump to adjust the pump's output and/or direction of hydraulic fluid flow. Additionally, the clutches 170, 172, 174 may receive commands (e.g., opening or closing commands) from the controller and actuators in the clutches or actuation systems coupled to the clutches may adjust the state of the clutch in response to receiving the command. For instance, the clutches may be actuated via hydraulically controlled pistons, although other suitable clutch actuators have been envisioned. The other controllable components in the transmissions system include the hydraulic motor 134, the motive power source 104, and the like. These controllable components may function similarly with regard to receiving control commands and adjusting an output and/or a state of a component responsive to receiving the command via an actuator. Additionally or alternatively, a vehicle electronic control unit (ECU) may be provided in the vehicle to control the power source (e.g., engine and/or motor). Furthermore, the control system 193 and specifically the controller 194 with the memory 196 and processor 195 may be configured to carry out the control methods expanded upon herein with regard to FIGS. 4-6.

The transmission system 100 may include input devices 149, 151 (e.g., a drive-input device (e.g., drive pedal), brake-input device (e.g., brake pedal), gear selector, and the like). The input device 151, responsive to driver input, may generate a power request. Further, the transmission system may automatically switch between drive modes when demanded. To elaborate, the operator may request a forward or reverse drive mode speed or torque change, and the transmission may increase speed or torque and automatically transition between the drive ranges associated with the different drive modes, when needed. Further, in one example, the operate may request reverse drive operation while the vehicle is operating in a forward drive mode. In such an example, the transmission may automatically initiate a shift (e.g., synchronous shift) between the forward and reverse drive modes. In this way, the operator may more efficiently control the vehicle, in comparison to transmissions designed for manual drive mode adjustment. However, in other examples, the system may be designed to allow the vehicle operator to manually request a mode change between the forward drive ranges, for instance. It will further be appreciated that the power source may be controlled in tandem with the transmission. For instance, when power request requested is received by the controller, the power source's output speed may be correspondingly increased.

The hydromechanical transmission 101 shown in FIG. 1 may be operated in different drive ranges (e.g., a reverse drive range, a first forward drive range, and a second forward drive range). In each of the drive ranges power flow through the hydrostatic assembly may be additive or circulatory to provide continuous range adjustment. To elaborate, the pump's displacement may be adjusted within each drive range to achieve different speed ratios. Specifically, in one example, the first forward drive range may be entered by engaging the first forward drive clutch 172 and disengaging and/or sustaining disengagement of the other clutches 170, 174. Entry into the other drive ranges may occur in a similar manner. For instance, the second forward drive range may be implemented by engaging the second forward drive clutch 174 and disengaging and/or sustaining disengagement of the clutches 170, 172. Further, the hydromechanical transmission 101 may be placed in a blocked condition by simultaneously engaging the first forward drive clutch 172 and the reverse clutch 170. Specifically, in one example, if the transmission output speed is null and the hydrostatic pump displacement is approaching an upper displacement (e.g., maximum displacement) then both the first forward clutch and the reverse clutch differential speeds are approximately zero and can therefore be closed for clutch blocking.

An axis system with an x-axis, y-axis, and z-axis is provided in FIGS. 1-3. The x-axis may be a lateral axis, the y-axis may be a longitudinal axis, and the z-axis may be parallel to a gravitational axis, although numerous orientations of the axes are possible.

FIGS. 2 and 3 depict an example of a transmission system 200 with a hydromechanical transmission 202 operating in a torque control mode and a speed control mode, respectively. The torque and speed control modes may be used at different times in a hill-hold strategy, discussed in greater detail herein with regard to FIGS. 4-6.

More generally, the torque control mode may be used while the transmission is engaged and the vehicle is in motion (e.g., in one of the drive modes such as the first forward drive range, the second forward drive range, or the reverse drive range) and the speed control mode may be implemented while the vehicle is stationary and the transmission is freewheeling, or for clutch synchronization.

The system 200 and hydromechanical transmission 202 are higher level examples of the transmission system 100 and hydromechanical transmission 101, depicted in FIG. 1. As such, the transmission system shown in FIGS. 2 and 3 may share common structural and/or function features with the transmission system, illustrated in FIG. 1, or vice versa.

The system 200 includes an engine 204 or other suitable power source, and axles and drive wheels 206 that are rotationally coupled to the hydromechanical transmission 202.

The hydromechanical transmission 202 includes a hydrostatic assembly 208 with a hydraulic pump 210 (e.g., hydrostatic pump) and a hydraulic motor 212 (e.g., hydrostatic motor) that are coupled via hydraulic lines 214. The hydrostatic assembly 208 is coupled in parallel with a portion of a mechanical assembly 216. In this way, the hydraulic pump and motor are in fluidic communication. Further, the pressure differential of the hydrostatic assembly 208 may refer to the pressure variance between hydraulic lines 214.

The mechanical assembly 216 may further include a planetary device 218 with a planetary gearset 220. The planetary gearset 220 includes a ring gear 222, carrier 224 on which planet gears 226 rotate, and a sun gear 228. Although the planetary gearset 220 is illustrated as a simple planetary gearset, the planetary device 218 may include a more complex gear arrangement, such as the multi-stage planetary gearset illustrated in FIG. 1. The planetary device 218 further includes a first forward drive clutch 230, a second forward drive clutch 232, and a reverse drive clutch 234. Although the clutches are schematically depicted, the clutches may be arranged in a similar manner to the transmission system 100, shown in FIG. 1.

Continuing with FIGS. 2 and 3, the engine's output 236 may be coupled to a gear 238 on a shaft 240 in the mechanical assembly 216. The gear 238 may mesh with a gear 242 on a shaft 244 rotationally coupled to the hydraulic pump 210.

Another gear 246 may reside on the shaft 240. The gear 246 may mesh with a gear 248 on a shaft 250 rotationally coupled to the ring gear 222. Additionally, in the mechanical assembly 216, the sun gear 228 may be rotationally coupled to the hydraulic motor 212 via a shaft 252. Still further, the carrier 224 is rotationally coupled to a shaft 254 that functions as the transmission's output. Specifically, the shaft 254 is rotationally coupled to the downstream driveline components such as the axles and drive wheels 206. The mechanical assembly 216 may further include a parking brake mechanism 256 designed to prevent rotation of the transmission output. As previously discussed, the parking brake may include calipers or other suitable friction devices, an actuator, and the like to maintain the transmission's output in a stationary state. The parking brake mechanism 256, the clutches 230, 232, 234, the pump 210, the engine 204, and the other controllable components in the system may be adjusted via command signals from a controller such as the controller 194, shown in FIG. 1.

Turning specifically to FIG. 2, in the torque control mode the hydraulic pump 210 is controlled to follow a hydraulic motor torque reference. Due to the control of the pump using the motor torque reference in the torque control mode, the motor speed is consequently not controlled. Put another way, in the torque control mode, the control of the hydraulic pump may follow a motor torque reference and is not controlled using a motor speed reference. Arrows 260, 262 characterize the torque and speed conversion that occurs on the motor side of the hydrostatic assembly 208 and conversely, arrows 264, 266 characterize speed and torque conversion on the pump side of the hydrostatic assembly.

Turning to FIG. 3, in the speed control mode the hydraulic pump 210 is controlled to follow a hydraulic motor speed reference. Due to the hydraulic pump being controlled to follow motor speed reference, the motor torque as a consequence is not controlled. In other words, while in the speed control mode, the hydraulic pump is controlled according to a motor speed reference and control of the pump using a motor torque reference is negated. Arrows 300, 302 characterize the torque and speed conversion that occurs on the motor side of the hydrostatic assembly 208 and conversely, arrows 304, 306 characterize speed and torque conversion on the pump side of the hydrostatic assembly.

A hydraulic control system 280 is further depicted in FIGS. 2-3. The hydraulic control system may include one or more pumps, a fluid reservoir, one or more valves, hydraulic lines, and the like to permit adjustment of the clutches 230, 232, 234. The hydraulic control system 280 may additionally control adjustment of the hydraulic pump 210. For instance, the pump may be controller via a hydraulic piston with valves that regulate pressure in the piston chambers.

FIG. 4 shows a hill-hold method 400 for a hydromechanical transmission. The method 400 may be carried out by the hydromechanical transmissions and components described above with regard to FIGS. 1-3, in one example. However, in other examples, the method 400 may be implemented using other suitable hydromechanical transmissions and corresponding components. Further, the method may be carried out as instructions stored in memory executed by a processor in a controller. As such, performing the method steps may include sending and/or receiving commands which trigger adjustment of associate components using actuators, as previously indicated.

At 402, the method includes determining operating conditions. Said operating conditions may include vehicle speed, clutch positions, operator power request, pump speed, motor speed, swash plate angle, clutch configurations, brake-input device position (e.g., brake pedal position), drive-input device position (e.g., drive pedal position), a vehicle incline, etc. These values may be ascertained via inputs from sensors and/or modeled. For instance, the incline of the vehicle may be determined using signals from an inclinometer and the torque of the hydraulic motor may be determined based on a shaft speed sensor. In other examples, the incline and/or the motor torque may be modeled.

At 404, the method includes operating the hydromechanical transmission in the torque control mode on a slope. A slope may be characterized as an angle measured from a longitudinal axis that is greater than 0 or 1 degree, for instance, the longitudinal axis being perpendicular to a gravitational axis. This torque control mode operation may include adjusting an angle of the hydraulic pump in the hydrostatic assembly to follow a hydraulic motor torque reference. As previously indicated, while the hydraulic pump follows the motor torque reference, the motor's speed is not controlled due to the inherent design of the hydrostatic unit. Further, in this mode the mechanical assembly of the transmission may be in one of the drive modes (e.g., the first forward drive mode).

Next at 406, the method includes determining if the drive pedal or other suitable drive input device has been disengaged (e.g., released) and the vehicle speed is close to zero (e.g., approaching zero or in a still condition). For instance, sensor inputs from the drive pedal may indicate an operator has discontinued pedal depression. Additionally or alternatively, brake pedal engagement may be used as an entry condition for the speed control mode. For example, when the brake pedal is depressed, the speed control mode may be activated. In one particular example, drive pedal disengagement and brake pedal engagement may both be used as entry conditions for hill-hold operation.

If it is determined that the drive pedal has not been disengaged or the vehicle is moving such that a still condition has not been reached (NO at 406), the method moves to 407 where the method includes maintaining the current transmission control strategy. For instance, the transmission may be torque controlled in one of the forward drive ranges. On the other hand, if it is determined that the drive pedal has been disengaged and the vehicle speed is close to zero (e.g., at a still condition) (YES at 406) the method moves to 408. At 408, the method includes operating the transmission in the speed control mode to reach and maintain a vehicle standstill target. For instance, the hydraulic pump may be controlled to follow a motor speed reference that balances the transmission output with the incline to achieve a zero speed or near zero speed. As such, holding the vehicle at standstill involves holding the vehicle at or approaching a zero speed value such that the vehicle remains stationary.

At 410, the method includes registering an output torque that keeps the vehicle at the standstill target. For instance, a pre-load pressure corresponding to the output torque may be stored in a suitable data structure such as a data table in the controller.

Next at 412, the method includes simultaneously engaging the first forward drive clutch and the reverse clutch to mechanically block rotation of the transmission output. For instance, if the vehicle was previously in a first range of the forward drive mode, engagement of the first forward clutch may be sustained while the reverse clutch is engaged. Conversely, if the vehicle was previously operating on a reverse drive mode, engagement of the reverse clutch may be sustained while the first forward drive clutch is engaged. Joint engagement of the forward and reverse drive clutches mechanically prevents rotation thereof, to permit use of a parking brake for hill-hold to be forgone, if desired.

At 414, the method includes reactivating the torque control mode once the forward and reverse drive clutches are engaged and blocking the transmission's output. As such, the transmission's speed control mode may be maintained until both clutches are closed at which point the transmission transitions from the speed control mode to the torque control mode.

At 416, the method includes maintaining the vehicle in a standstill condition and reducing the differential pressure of the hydrostatic assembly. For instance, the hydrostatic assembly may be controlled to achieve a null torque or a near null torque condition. In other words, the hydrostatic assembly may follow a null torque set-point. Reducing the differential pressure of the hydrostatic assembly may include depressurizing the hydrostatic assembly. Depressurization may include decreasing the differential pressure in the hydrostatic unit to a null value or a value approaching zero. For example, rotation of the pump and motor shafts may be discontinued to depressurize the hydrostatic assembly. In this way, transmission efficiency during hill-hold is increased.

At 418, the method includes determining if the drive pedal or other drive-input device has been re-engaged. The drive pedal engagement may be ascertained via a drive pedal sensor. As such, a reapplication of pressure to the drive pedal may trigger drive-input device reengagement.

If the drive pedal has not been reengaged (NO at 418), the method moves to 419 where the method includes maintaining the current transmission control strategy. For instance, the vehicle may maintain standstill in the torque control mode by following a null torque or near null torque set-point.

If the drive pedal has been reengaged (YES at 418) the method proceeds to 420 where the method includes applying a pre-load to the hydrostatic unit based on a drive mode (e.g., forward-reverse-neutral (FRN)) setting. For instance, when a mode selector (e.g., gearshift) indicates an operator's intent to place the vehicle in a forward drive mode, a pre-load may be applied to the hydrostatic assembly which correlates to the registered pre-load pressure associated with the forward drive mode. Using the registered pre-load pressure in this manner permits the hydrostatic assembly to rapidly initiate vehicle movement with a decreased likelihood of backsliding. Using the pre-load pressure in this manner further permits the precise movement of the vehicle on comparatively high angle slopes and permits the standstill condition to be maintained independent from engine speed variation, if so desired. Further, using the pre-load pressure enables the vehicle to be restarted from standstill with a lower engine speed, thereby reducing fuel consumption.

At 422, the method judges if the differential pressure in the hydrostatic assembly is greater than the pressure preload set-point. Such a determination may compare the registered pressure preload against inputs from one or more pressure sensors in the hydrostatic assembly or a differential pressure from a model of the hydrostatic assembly.

If it is determined that the differential pressure has not exceeded the pressure preload set-point (NO at 422) the method moves to 423 where the method includes maintaining the current transmission control strategy. For instance, the pre-load pressure may be sustained while the differential pressure is increased.

If it is determined that the differential pressure has exceeded the pressure preload set-point (YES at 422) the method moves to 424. At 424, the method includes disengaging one of the clutches that does not correspond to the drive mode setting. For instance, when a forward drive mode is selected, the reverse drive clutch may be disengaged. Conversely, when a reverse drive mode is selected, the forward drive clutch may be disengaged.

At 426, the method includes judging whether the operator requested torque is greater than a preload output torque. The operator requested torque may correlate to a drive pedal position and the preload output torque may correlate to the preload pressure. For instance, a torque output of the transmission may be detected via a sensor or modeled (e.g., continuously modeled) and compared with the operator requested torque.

If the operator requested torque does not exceed the preload output torque (NO at 426) the method moves to 428. At 428, the method includes maintaining the current transmission control strategy. For instance, torque control of the hydrostatic assembly may continue while the reverse or forward drive clutch remains disengaged.

If the operator requested torque exceeds the preload output torque (YES at 426) the method proceeds to 430. At 430, the method initiates vehicle motion in a desired direction while avoiding unwanted movement in the direction opposite than the intended drive direction. For instance, backwards movement may be avoided when the vehicle is restarted in the forward drive mode (e.g., the first forward drive range). In this way, the vehicle may transition from a stationary state to a drive state (e.g., a forward or reverse drive state). Method 400 enables speed and torque control modes to be strategically implemented while the vehicle hill-hold unfolds to increase transmission efficiency and decrease the chance of the vehicle moving in an unintended direction when vehicle motion resumes from a standstill. Further, the method may be carried out with the parking brake disengaged. As such, the parking brake mechanism may be sustained in a disengaged state while method 400 is implemented. In this way, the vehicle can maintain standstill on relatively high angle slopes with mechanical parking brake usage, if wanted.

FIG. 5 shows a graphical representation of a prophetic use-case hill-hold technique of a hydromechanical transmission. In each plot, time is indicated on the abscissa and increases in the direction of the arrow.

Plot 500 has hydrostatic assembly mode ("torque control" and "speed control") on the ordinate. Plots 502, 504 have a clutch control pressure on the ordinate for the forward clutch (CF) and the reverse clutch (CR), respectively. It will be understood, that the clutches are hydraulically controlled and therefore the pressures delivered to a clutch actuator (e.g., clutch control piston) may correspond to different clutch control modes. These control conditions (closed, closing prefill, filling, and opening) of the forward clutch and the reverse corresponding to plots 502, 504 are additionally depicted in FIG. 5. It will be understood that a clutch is closed when it is engaged and permitting torque transfer therethrough. Prefill refers to a control state of the clutch where a pressure is delivered to the clutch's actuator to ready the clutch for opening or closing, to reduce clutch control latency. Plot 506 has vehicle speed on the ordinate and plot 508 has drive device position (e.g., drive pedal position) on the ordinate.

From t0 to t1, the forward clutch is closed and the reverse clutch is in prefill. Operating the clutch in prefill may include supplying a control fluid (e.g., oil) to the clutch at pressure which does not induce actuation and decreases actuation delays. Further, from t0 to t1, the hydrostatic assembly is operated in the torque control mode as the vehicle speed decreases.

At t1, the hydrostatic assembly is switched from the torque control mode to the speed control mode. While in the speed control mode, the vehicle is maintained at a standstill after zero speed is reached at t2. At t2, the halting output torque and/or corresponding hydrostatic assembly preload pressure may be recorded. When the zero vehicle speed is reached, the reverse clutch enters a filling mode where fluid is delivered to the clutch's actuator to fill a piston chamber.

At t3, closing of the reverse clutch to induce clutch engagement begins while speed control of the hydrostatic assembly continues. Once the reverse clutch is engaged at t4, the torque control mode of the hydrostatic assembly resumes. In this way, the speed control mode is used to hold the vehicle in standstill until the forward and reverse drive clutches are both closed and blocking the transmission's output. Consequently, clutch blocking may be effectively used to maintain the vehicle at standstill while the hydrostatic assembly is depressurized for efficiency.

At t5, the vehicle operator depressed the drive pedal or other suitable drive device and the hydrostatic assembly is repressurized using the preload pressure value that was recorded during speed control operation. At t6, once the hydrostatic assembly's differential pressure exceeds the preload pressure, the reverse clutch begins to open while the forward clutch remains closed and forward motion resumes. At t7, the reverse clutch is fully opened and enters a prefill mode while the vehicle speed continues to increase. In this way, forward motion of the vehicle smoothly resumes without the vehicle rolling backwards.

FIG. 6 shows a graphical representation of a prophetic use-case hill-hold technique of a hydromechanical transmission. In each plot, time is indicated on the abscissa and increases in the direction of the arrow.

Plot 600 has hydrostatic assembly mode ("torque control" and "speed control") on the ordinate. Plots 602, 604 correspond to pressures delivered to a forward clutch (CF) and a reverse clutch (CR), respectively, and have the measured clutch control pressure on the ordinate. The measured clutch control pressure may closely follow the corresponding clutch pressure control set-point. Further, the hydraulic control conditions (closed, closing, blocking, prefill, filling, and opening) for the forward clutch and the reverse clutch are further illustrated in FIG. 6. Plots 606 and 608 indicate a measured differential pressure of the hydrostatic unit and a differential pressure set-point, respectively, with pressure on the ordinates that increases in the direction of the arrow. Plot 610 has output shaft speed on the ordinate that increases in the direction of the arrow. Plot 612 has drive pedal engagement percentage on the ordinate that increases in the direction of the arrow.

At t0, the drive pedal is released and correspondingly from t0 to t1 the vehicle speed decreases. At t1, the hydrostatic assembly switches from the torque control mode to the speed control mode. In the speed control mode, the hydrostatic assembly's differential pressure 606 follows the setpoint pressure 608 such that the vehicle remains at standstill (e.g., at a null speed value or approaching a null speed value). Just before or at t2, the preload pressure demanded for holding the vehicle at standstill is recorded and after t2, the hydrostatic assembly is transitioned from the speed control mode back to the torque control mode and the hydrostatic assembly is depressurized when both the forward clutch and the reverse clutch are closed and blocking transmission output rotation. Consequently, unwarranted pressurization of the hydrostatic unit during hill-hold may be avoided, thereby increasing transmission efficiency.

At t3, the operator depresses the drive pedal and the previously recorded preload pressure is reapplied to the hydrostatic assembly. At t4, opening of the reverse clutch begins and at t5 the reverse clutch is fully opened. After t5, the reverse clutch is set in a prefill mode. In this way, the vehicle may be efficiently transitioned back to a drive mode from standstill while preventing the vehicle from moving in an unintended direction when exiting hill-hold.

The technical effect of the transmission systems and control methods described herein is to efficiently operate the transmission to provide hill-hold as well as reduce the chance of the vehicle traveling in an unwanted direction (e.g., sliding backwards) when hill-hold is released and the vehicle motion (e.g., forward motion) resumes.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a hydromechanical transmission system for a vehicle is provided that, comprises a hydrostatic assembly comprising a hydraulic pump in fluidic communication with a hydraulic motor; a controller including: instructions that when executed, while the vehicle is on a slope, cause the controller to: selectively transition between a torque control mode and a speed control mode of the hydrostatic assembly.

In another aspect, a method for operation of a transmission system is provided that comprises operating a hydrostatic assembly in a speed control mode; while the hydrostatic assembly is operated in the speed control mode, beginning simultaneous engagement of two or more clutches to mechanically hold an output of the transmission system in a stationary state; and responsive to the achieving the simultaneous engagement of the two or more clutches, switching to a torque control mode of the hydrostatic assembly and reducing a differential pressure in the hydrostatic assembly. In one example, the method may further comprise, while the two or more clutches mechanically hold the output of the transmission system in the stationary state, disengaging or sustaining disengagement of a parking brake mechanism. In yet another example, the method may further comprise, prior to reducing the differential pressure in the hydrostatic assembly, storing a differential pressure value of the hydrostatic assembly while the output of the transmission system is in the stationary state and the hydrostatic assembly is in the speed control mode; subsequent to reducing the differential pressure in the hydrostatic assembly, responsive to actuation of a drive device, transitioning from the speed control mode to the torque control mode of the hydrostatic assembly; and while the hydrostatic assembly in operating in the torque control mode, pressurizing the hydrostatic assembly based on the stored differential pressure value. Still further in another example, the method may further comprise operating the transmission system to achieve a requested output torque corresponding to the drive device actuation when the requested output torque is greater than a preload output torque; wherein the preload output torque corresponds to the stored differential pressure value.

In another aspect, a hydromechanical variable transmission of a vehicle is provided that comprises a hydrostatic assembly including a variable displacement hydrostatic pump and a hydrostatic motor; a controller including: instructions that when executed, while the vehicle is on a slope, cause the controller to: coordinate operation of the hydrostatic assembly in a torque control mode and a speed control mode to hold the vehicle in a standstill condition.

In any of the aspects or combinations of the aspects, selectively transitioning between the torque control mode and the speed control mode may include responsive to operation of an input device to place the vehicle in a standstill condition, activating the speed control mode to achieve a vehicle standstill target; and in the speed control mode, initiate simultaneous engagement of a forward drive clutch and a reverse drive clutch to prevent rotation of an output of the hydromechanical transmission system; and when the forward drive clutch and the reverse drive clutch are engaged operating the hydrostatic assembly in the torque control mode and reducing a differential pressure of the hydrostatic assembly.

In any of the aspects or combinations of the aspects, reducing the differential pressure of the hydrostatic assembly may include depressurizing the hydrostatic assembly.

In any of the aspects or combinations of the aspects, the controller may further comprise instructions that when executed, while the vehicle is on the slope, in the standstill state, and prior to reducing the differential pressure of the hydrostatic assembly, cause the controller to: store a differential pressure value of the hydrostatic assembly; and instructions that when executed, when the vehicle transitions from the standstill state to a drive state, cause the controller to: repressurize the hydrostatic assembly based on the stored differential pressure value; and open a clutch in a mechanical assembly of the hydromechanical transmission system.

In any of the aspects or combinations of the aspects, selectively transitioning between the torque control mode and the speed control mode may include prior to activation of the speed control mode, operating the hydrostatic assembly in the torque control mode in a selected drive range.

In any of the aspects or combinations of the aspects, the input device may be a brake-input device and the brake-input device is disengaged to activate the speed control mode; or the input device may be drive-input device and the drive-input device is engaged to activate the speed control mode.

In any of the aspects or combinations of the aspects, selectively transitioning between the torque control mode and the speed control mode may include in the speed control mode, storing a preload pressure value corresponding to a preload output torque that holds the vehicle in standstill; and responsive to reengagement of a drive device, pressurizing the hydrostatic assembly based on the stored preload pressure value in the torque control mode.

In any of the aspects or combinations of the aspects, in the torque control mode, the hydraulic pump may be operated using a hydraulic motor torque reference and is not controlled using a hydraulic motor speed reference.

In any of the aspects or combinations of the aspects, in the speed control mode, the hydraulic pump may be operated using a hydraulic motor speed reference and is not controlled using a hydraulic motor torque reference.

In any of the aspects or combinations of the aspects, the controller may further comprise instructions that when executed, while the hydrostatic assembly is in the speed control mode and the forward and reverse drive clutches are engaged, cause the controller to: sustain disengagement of a parking brake mechanism in a mechanical assembly.

In any of the aspects or combinations of the aspects, in the torque control mode the hydrostatic assembly may be operated at a null torque set-point.

In any of the aspects or combinations of the aspects, operating the two or more clutches to mechanically hold the output of the transmission system in the stationary state may include engaging or sustaining engagement of a forward drive clutch and a reverse drive clutch; wherein the forward drive clutch is adjacent and coaxial to the reverse drive clutch.

In any of the aspects or combinations of the aspects, coordinating operation of the hydrostatic assembly in the torque control mode and the speed control mode may include while the hydrostatic assembly is in the speed control mode, initiating engagement or sustaining engagement of each of a forward drive clutch and a reverse drive clutch; and responsive to both the forward drive clutch and the reverse drive clutch reaching simultaneously engagement, operating the hydrostatic assembly in the torque control mode to achieve a null torque set-point.

In any of the aspects or combinations of the aspects, coordinating operation of the hydrostatic assembly in the torque control mode and the speed control mode may include depressurizing the hydrostatic assembly while the hydrostatic assembly is operated in the torque control mode to achieve the null torque set-point.

In any of the aspects or combinations of the aspects, coordinating operation of the hydrostatic assembly in the torque control mode and the speed control mode may include prior to initiating engagement of each of the forward drive clutch and the reverse drive clutch, transitioning the hydrostatic assembly into the speed control mode from the torque control mode when a drive device is released; and while the hydrostatic assembly is in the speed control mode, storing a preload pressure value corresponding to a preload output torque that holds the vehicle in the standstill condition; and while the hydrostatic assembly is in the torque control mode, pressurizing the hydrostatic assembly based on the stored preload pressure value responsive to drive device reengagement.

In another representation, a power-split transmission is provided that includes a hydrostatic unit that transitions between speed control operation and torque control operation during a hill-hold condition, wherein in speed control operation a hydrostatic pump follows a hydrostatic motor speed reference and wherein in torque control operation the hydrostatic pump follows a hydrostatic motor torque reference.

As used herein, the term "approximately" is construed to mean plus or minus five percent of the range, unless otherwise specified.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein. As such the above described embodiments have been presented by way of example, and not limitation. The embodiments described above are therefore to be considered in all respects as illustrative, not restrictive. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydromechanical transmission system for a vehicle, comprising:
a hydrostatic assembly comprising a hydraulic pump in fluidic communication with a hydraulic motor; and
a controller including:
instructions that when executed, while the vehicle is on a slope, cause the controller to:
selectively transition between a torque control mode and a speed control mode of the hydrostatic assembly, wherein selectively transitioning between the torque control mode and the speed control mode includes:
responsive to operation of an input device to place the vehicle in a standstill state, activating the speed control mode to achieve a vehicle standstill target;
in the speed control mode, initiating simultaneous engagement of a forward drive clutch and a reverse drive clutch to prevent rotation of an output of the hydromechanical transmission system; and
when the forward drive clutch and the reverse drive clutch are engaged, operating the hydrostatic assembly in the torque control mode and reducing a differential pressure of the hydrostatic assembly.

2. The hydromechanical transmission system of claim 1, wherein reducing the differential pressure of the hydrostatic assembly includes depressurizing the hydrostatic assembly.

3. The hydromechanical transmission system of claim 1, wherein the controller further comprises:
instructions that when executed, while the vehicle is on the slope, in the standstill state, and prior to reducing the differential pressure of the hydrostatic assembly, cause the controller to:
store a differential pressure value of the hydrostatic assembly; and
instructions that when executed, when the vehicle transitions from the standstill state to a drive state, cause the controller to:
repressurize the hydrostatic assembly based on the stored differential pressure value; and open a clutch in a mechanical assembly of the hydromechanical transmission system.

4. The hydromechanical transmission system of claim 1, wherein selectively transitioning between the torque control mode and the speed control mode includes:
prior to activation of the speed control mode, operating the hydrostatic assembly in the torque control mode in a selected drive range.

5. The hydromechanical transmission system of claim 4, wherein:
the input device is a brake-input device and the brake-input device is disengaged to activate the speed control mode; or
the input device is a drive-input device and the drive-input device is engaged to activate the speed control mode.

6. A hydromechanical transmission system for a vehicle, comprising:
a hydrostatic assembly comprising a hydraulic pump in fluidic communication with a hydraulic motor; and
a controller including:
instructions that when executed, while the vehicle is on a slope, cause the controller to:
selectively transition between a torque control mode and a speed control mode of the hydrostatic assembly, wherein selectively transitioning between the torque control mode and the speed control mode includes:
in the speed control mode, storing a preload pressure value corresponding to a preload output torque that holds the vehicle in standstill; and
responsive to reengagement of a drive device, pressurizing the hydrostatic assembly based on the stored preload pressure value in the torque control mode.

7. The hydromechanical transmission system of claim 1, wherein, in the torque control mode, the hydraulic pump is operated using a hydraulic motor torque reference and is not controlled using a hydraulic motor speed reference.

8. The hydromechanical transmission system of claim 1, wherein, in the speed control mode, the hydraulic pump is operated using a hydraulic motor speed reference and is not controlled using a hydraulic motor torque reference.

9. The hydromechanical transmission system of claim 1, wherein the controller further comprises:
instructions that when executed, while the hydrostatic assembly is in the speed control mode and the forward and reverse drive clutches are engaged, cause the controller to:
sustain disengagement of a parking brake mechanism in a mechanical assembly.

10. A method for operation of a transmission system, comprising:
operating a hydrostatic assembly in a speed control mode;
while the hydrostatic assembly is operated in the speed control mode, beginning simultaneous engagement of two or more clutches to mechanically hold an output of the transmission system in a stationary state; and
responsive to the achieving the simultaneous engagement of the two or more clutches, switching to a torque control mode of the hydrostatic assembly and reducing a differential pressure in the hydrostatic assembly.

11. The method of claim 10, wherein, in the torque control mode, the hydrostatic assembly is operated at a null torque set-point.

12. The method of claim 10, further comprising, while the two or more clutches mechanically hold the output of the transmission system in the stationary state, disengaging or sustaining disengagement of a parking brake mechanism.

13. The method of claim 10, further comprising:
prior to reducing the differential pressure in the hydrostatic assembly, storing a differential pressure value of the hydrostatic assembly while the output of the transmission system is in the stationary state and the hydrostatic assembly is in the speed control mode;
subsequent to reducing the differential pressure in the hydrostatic assembly, and responsive to actuation of a drive device, transitioning from the speed control mode to the torque control mode of the hydrostatic assembly; and
while the hydrostatic assembly is operating in the torque control mode, pressurizing the hydrostatic assembly based on the stored differential pressure value.

14. The method of claim 13, further comprising:
operating the transmission system to achieve a requested output torque corresponding to the drive device actuation when the requested output torque is greater than a preload output torque;
wherein the preload output torque corresponds to the stored differential pressure value.

15. The method of claim 10, wherein operating the two or more clutches to mechanically hold the output of the transmission system in the stationary state includes:
engaging or sustaining engagement of a forward drive clutch and a reverse drive clutch; and
wherein the forward drive clutch is adjacent and coaxial to the reverse drive clutch.

16. A hydromechanical variable transmission of a vehicle, comprising:
a hydrostatic assembly including a variable displacement hydrostatic pump and a hydrostatic motor; and
a controller including:
instructions that when executed, while the vehicle is on a slope, cause the controller to:
coordinate operation of the hydrostatic assembly in a torque control mode and a speed control mode to hold the vehicle in a standstill condition, wherein coordinating operation of the hydrostatic assembly in the torque control mode and the speed control mode includes:
while the hydrostatic assembly is in the speed control mode, initiating engagement or sustaining engagement of each of a forward drive clutch and a reverse drive clutch; and
responsive to both the forward drive clutch and the reverse drive clutch reaching simultaneous engagement, operating the hydrostatic assembly in the torque control mode to achieve a null torque set-point.

17. The hydromechanical variable transmission of claim 16, wherein coordinating operation of the hydrostatic assembly in the torque control mode and the speed control mode includes:
depressurizing the hydrostatic assembly while the hydrostatic assembly is operated in the torque control mode to achieve the null torque set-point.

18. The hydromechanical variable transmission of claim 16, wherein coordinating operation of the hydrostatic assembly in the torque control mode and the speed control mode includes:
prior to initiating engagement of each of the forward drive clutch and the reverse drive clutch, transitioning the hydrostatic assembly into the speed control mode from the torque control mode when a drive device is released;
while the hydrostatic assembly is in the speed control mode, storing a preload pressure value corresponding to a preload output torque that holds the vehicle in the standstill condition; and
while the hydrostatic assembly is in the torque control mode, pressurizing the hydrostatic assembly based on the stored preload pressure value responsive to drive device reengagement.

* * * * *